United States Patent
Mishriki et al.

(10) Patent No.: US 11,108,282 B2
(45) Date of Patent: Aug. 31, 2021

(54) POWERED JOINT WITH WIRELESS TRANSFER

(71) Applicant: Apple Inc., Cupertino, CA (US)

(72) Inventors: Fady Mishriki, Auckland (NZ); Lawrence Bernardo dela Cruz, Auckland (NZ); Daniel James Robertson, Auckland (NZ); John Kinnear Terry, Auckland (NZ); Saining Ren, Auckland (NZ)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 16/200,960

(22) Filed: Nov. 27, 2018

(65) Prior Publication Data

US 2019/0097472 A1 Mar. 28, 2019

Related U.S. Application Data

(63) Continuation of application No. PCT/NZ2017/050071, filed on May 30, 2017.

(60) Provisional application No. 62/344,016, filed on Jun. 1, 2016.

(51) Int. Cl.
*H02J 7/02* (2016.01)
*H02J 7/04* (2006.01)
(Continued)

(52) U.S. Cl.
CPC .............. *H02J 50/90* (2016.02); *H02J 50/10* (2016.02); *H02J 50/40* (2016.02); *H04B 5/00* (2013.01);
(Continued)

(58) Field of Classification Search
CPC .. B25J 17/0275; H04B 5/0081; H04B 5/0037; H04B 5/00; H02J 50/90; H02J 50/10; H02J 50/40
See application file for complete search history.

(56) References Cited

U.S. PATENT DOCUMENTS

| 4,973,907 A | 11/1990 | Bergman et al. |
| 5,000,178 A | 3/1991 | Griffith |

(Continued)

FOREIGN PATENT DOCUMENTS

| AU | 2014262220 B2 | 12/2015 |
| CN | 101461114 | 6/2009 |

(Continued)

OTHER PUBLICATIONS

Wai Man Ng et al "Two-and Three Dimensional Omnidirectional Wireless Power Transfer"; IEEE transactions on Power Electronics, vol. 29, No. 9, Sep. 2014.

(Continued)

*Primary Examiner* — Carlos Amaya
*Assistant Examiner* — Esayas G Yeshaw
(74) *Attorney, Agent, or Firm* — Blank Rome LLP

(57) ABSTRACT

A powered joint having a first joint component and second joint component in which the first joint component has multiple degrees of rotational freedom with respect to the second joint component, the powered joint including one or more power transmission coils associated with the first component; a plurality of power receiving coils associated with the second component; a sensor which determines the orientation of the second component with respect to the first component; and a control circuit for selectively connecting one of the plurality of power receiving coils to a power receiving circuit based on information received from the sensor.

23 Claims, 7 Drawing Sheets

(51) Int. Cl.
    *H02J 50/90*           (2016.01)
    *H04B 5/00*           (2006.01)
    *H02J 50/10*           (2016.01)
    *H02J 50/40*           (2016.01)
    *B25J 17/02*          (2006.01)

(52) U.S. Cl.
    CPC ......... *H04B 5/0037* (2013.01); *H04B 5/0081* (2013.01); *B25J 17/0275* (2013.01)

(56) References Cited

U.S. PATENT DOCUMENTS

| | | |
|---|---|---|
| 5,469,036 A | 11/1995 | Eto |
| 5,496,036 A | 3/1996 | Chester |
| 5,519,262 A | 5/1996 | Wood |
| 5,850,135 A | 12/1998 | Kuki et al. |
| 6,157,162 A | 12/2000 | Hayashi et al. |
| 6,570,541 B2 | 5/2003 | Dettloff |
| 6,686,823 B2 | 2/2004 | Arntz et al. |
| 7,132,918 B2 | 11/2006 | Baarman et al. |
| 7,197,113 B1 | 3/2007 | Katcha et al. |
| 7,650,192 B2 | 1/2010 | Wahlstrand |
| 7,880,337 B2 | 2/2011 | Farkas |
| 8,198,858 B2 | 6/2012 | Kim et al. |
| 8,228,010 B2 | 7/2012 | Zadeh |
| 8,692,639 B2 | 4/2014 | Baarman et al. |
| 8,824,624 B2 | 9/2014 | Loef et al. |
| 9,064,632 B2 | 6/2015 | Loiselle et al. |
| 9,190,866 B2 | 11/2015 | Cheikh et al. |
| 9,236,174 B2 | 1/2016 | Lee |
| 2001/0000960 A1 | 5/2001 | Dettloff |
| 2003/0214255 A1 | 11/2003 | Baarman et al. |
| 2005/0068019 A1 | 3/2005 | Nakamura et al. |
| 2007/0064406 A1 | 3/2007 | Beart |
| 2008/0002934 A1 | 1/2008 | Hagen et al. |
| 2008/0303351 A1 | 12/2008 | Jansen et al. |
| 2009/0001932 A1 | 1/2009 | Kamijo et al. |
| 2009/0079270 A1 | 3/2009 | Mikimoto |
| 2009/0096413 A1 | 4/2009 | Partovi et al. |
| 2010/0109604 A1 | 5/2010 | Boys et al. |
| 2010/0201533 A1 | 8/2010 | Kirby et al. |
| 2010/0259217 A1 | 10/2010 | Baarman et al. |
| 2010/0289340 A1 | 11/2010 | Boys et al. |
| 2011/0181118 A1 | 7/2011 | Chen et al. |
| 2012/0098485 A1 | 4/2012 | Kang et al. |
| 2012/0319358 A1 | 6/2012 | Teggatz et al. |
| 2012/0188041 A1 | 7/2012 | Kook |
| 2012/0223589 A1 | 9/2012 | Low et al. |
| 2013/0030892 A1 | 1/2013 | Liu et al. |
| 2013/0049456 A1 | 2/2013 | Kim et al. |
| 2013/0049482 A1 | 2/2013 | Rofe et al. |
| 2013/0119773 A1 | 5/2013 | Davis |
| 2013/0175984 A1 | 7/2013 | Yamazaki et al. |
| 2013/0229061 A1 | 9/2013 | Budhia et al. |
| 2013/0257360 A1 | 10/2013 | Singh |
| 2013/0285606 A1* | 10/2013 | Ben-Shalom ........... H02J 50/12 320/108 |
| 2013/0328407 A1* | 12/2013 | Shimura ................ H01F 38/14 307/104 |
| 2014/0091755 A1 | 4/2014 | Walley et al. |
| 2014/0125140 A1 | 5/2014 | Weidmer et al. |
| 2014/0177197 A1 | 6/2014 | Lampinen |
| 2014/0197687 A1 | 7/2014 | Lin |
| 2014/0285008 A1 | 9/2014 | Azancot et al. |
| 2014/0339904 A1 | 11/2014 | Kari et al. |
| 2014/0354222 A1 | 12/2014 | Park et al. |
| 2015/0048752 A1 | 2/2015 | Van Den Brink et al. |
| 2015/0054344 A1 | 2/2015 | Ng et al. |
| 2015/0204928 A1 | 7/2015 | Hoover |
| 2015/0205750 A1* | 7/2015 | Hendin ..................... G09C 1/00 713/155 |
| 2015/0207337 A1 | 7/2015 | Peterson et al. |
| 2015/0236526 A1* | 8/2015 | Jadidian ................ H02J 50/12 320/108 |
| 2015/0318730 A1 | 11/2015 | Bhargava et al. |
| 2016/0064994 A1 | 3/2016 | Ku et al. |
| 2016/0099602 A1 | 4/2016 | Leabman et al. |
| 2016/0380488 A1* | 12/2016 | Widmer ............... H04B 5/0037 324/207.15 |
| 2017/0005523 A1* | 1/2017 | Widmer .................. B60L 53/36 |
| 2017/0077736 A1* | 3/2017 | Leabman ............. H04B 5/0037 |
| 2018/0342896 A1* | 11/2018 | Zhang ..................... H02J 50/40 |

FOREIGN PATENT DOCUMENTS

| | | |
|---|---|---|
| CN | 103003897 A | 3/2013 |
| DE | 19932504 A1 | 2/2001 |
| DE | 102012218663 A1 | 4/2014 |
| EP | 1041589 B1 | 1/2008 |
| EP | 2602908 A1 | 6/2013 |
| EP | 3127215 A1 | 2/2017 |
| JP | 60-254400 A | 12/1985 |
| JP | 3-133110 | 6/1991 |
| JP | H06277358 | 10/1994 |
| JP | 2001044054 | 2/2001 |
| JP | 2001196249 A | 7/2001 |
| JP | 2002246248 | 8/2002 |
| JP | 2005302959 A | 10/2005 |
| JP | 06-029128 A | 2/2006 |
| JP | 2006042519 | 2/2006 |
| JP | 06-105471 A | 4/2006 |
| JP | 2006128381 | 5/2006 |
| JP | 2006245363 A | 9/2006 |
| JP | 2007505480 | 3/2007 |
| JP | 2009088479 A | 4/2009 |
| JP | 2011229360 | 11/2011 |
| JP | 04955691 B2 | 6/2012 |
| JP | 2012119496 A | 6/2012 |
| JP | 2012120328 A | 6/2012 |
| JP | 2013534040 A | 8/2013 |
| JP | 2015133904 A | 7/2015 |
| KR | 100944113 | 2/2010 |
| KR | 1020100017582 | 2/2010 |
| KR | 1509929 B1 | 4/2015 |
| WO | 2003105308 | 12/2003 |
| WO | 2005024865 | 3/2005 |
| WO | 2005109598 A1 | 11/2005 |
| WO | 200712632 | 11/2007 |
| WO | 2007126321 | 11/2007 |
| WO | 2008/108963 | 9/2008 |
| WO | 2008137996 A1 | 11/2008 |
| WO | 2008140333 | 11/2008 |
| WO | 2009/081115 | 7/2009 |
| WO | 2010/090539 | 8/2010 |
| WO | 2010/093724 | 8/2010 |
| WO | 2010090538 | 8/2010 |
| WO | 2010090539 | 8/2010 |
| WO | 2011/016737 | 2/2011 |
| WO | 2011016736 | 2/2011 |
| WO | 2011016737 | 2/2011 |
| WO | 2012/018268 | 2/2012 |
| WO | 2012019663 A1 | 2/2012 |
| WO | 2012061247 | 5/2012 |
| WO | 2012073427 A1 | 6/2012 |
| WO | 2012150293 | 11/2012 |
| WO | 2013025776 A1 | 2/2013 |
| WO | 2013/036146 | 3/2013 |
| WO | 2013036146 A1 | 3/2013 |
| WO | 2013122483 A1 | 8/2013 |
| WO | 2013141717 | 9/2013 |
| WO | 2013/186180 A1 | 12/2013 |
| WO | 2014011059 A1 | 1/2014 |
| WO | 2014083015 A1 | 6/2014 |
| WO | 2014179320 A1 | 11/2016 |

OTHER PUBLICATIONS

Budhia, et al., "Develpoment of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011. 2179274, p. 325.

(56) References Cited

OTHER PUBLICATIONS

Bosshard et al., "Comprehensive Evaluation of Rectangular and Double-D Coil Geometry for 50 kw/85 kHz IPT System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE.2016.2600162, p. 1408.

"Abdolkhani A. et al., "A Novel Detached Magnetic Coupling Structure for Contactless Power Transfer", IECON/ICELIE, 1103-1108 (2011)".

"Abdolkhani, A. et al., "A Sandwiched Magnetic Coupling Structure for Contactless Slipring Applications", International Geoinformatics Research and Development, 2(3): 1-9 (2011)".

"Abdolkhani, A. et al., "Face to Face Through-hole Contactless Slipring System for Rotary Applications", IJAREEIE, 2(9): 4277-4286 (2013)".

"Abdolkhani, A. et al., "Modelling and Parameters Identification of Through-Hole Type Wind Turbine Contactless Sliprings", SCIRP/ Engineering, 4: 272-283 (2012)".

"Esser, A. et al., "A New Approach to Power Supplies for Robots", IEEE Transactions on Industry Applications, 27(5): 872-875 (1991)".

"Kacprzak, D. "A Novel S-Pickup for High Power Inductive Power Transfer Systems", Magnetics Conference, INTERMAG, 1 pg. (2006)".

"Kacprzak, D. et al., "An Improved Magnetic Design for Inductively Coupled Power Transfer System Pickups", Power Engineering Conference, IPEC, 1133-1136 (2005)".

"Legranger, J. et al., "Comparison of Two Optimal Rotary Transformer Designs for Highly Constrained Applications", Electric Machines & Drives Conference, IEMDC, 1546-1551 (2007)".

"Moradewicz, A.J. et al., "High efficiency contactless energy transfer system with power electronic resonant converter", Technical Sciences, 57(4): 375-381 (2009)".

"Muljadi, E. et al., "Pitch-Controlled Variable-Speed Wind Turbine Generation", Industry Applications Conference, 34th IAS Annual Meeting, Conference Record of the 1999 IEEE, 1: 323-330 (1999)".

"Papastergiou, K. et al., "An Airborne Radar Power Supply With Contactless Transfer of Energy—Part I: Rotating Transformer", IEEE Transactions on Industrial Electronics, 54(5): 2874-2884 (2007)".

"Papastergiou, K. et al., "Contact-less Transfer of Energy by means of a Rotating Transformer", IEEE ISIE, 1735-1740 (2005)".

"Potter, B.A. et al., "Design, Implementation and Characterisation of a Contactless Power Transfer System for Rotating Applications", IEEE, 2168-2173 (2006)".

"Spackman, D. et al., "Magnetic Interference in Multi-Pickup Monorail Inductively Coupled Power Transfer Systems", Journal of the Japan Society of Applied Electromagnetics and Mechanics, 15(3): 238-241 (2007)".

"Zaheer, A. et al., "A Bipolar Pad in a 10 kHz, 300W Distributed IPT System for AGV applications", IEEE Transactions on Industrial Electronics, pp. 1-14 (2013)".

Abdolkhani et al. "Wireless Charging Pad based on Traveling Magnetic Field for Portable Consumer Electronics." IEEE, 2013 pp. 1416-1421.

\* cited by examiner

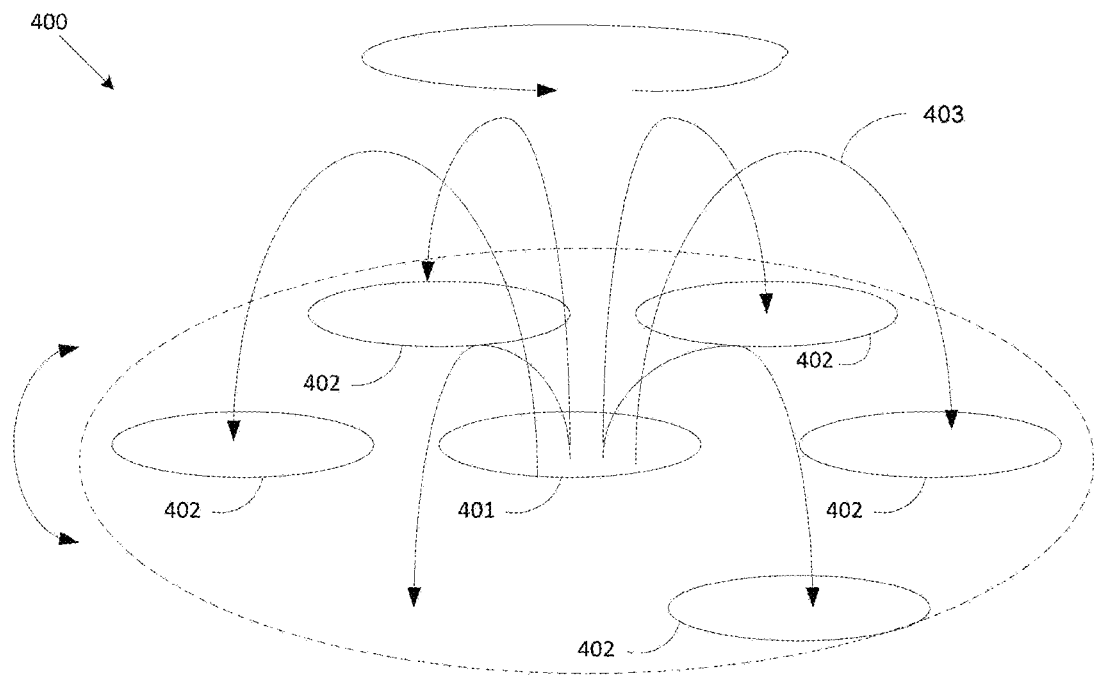
Figure 4A
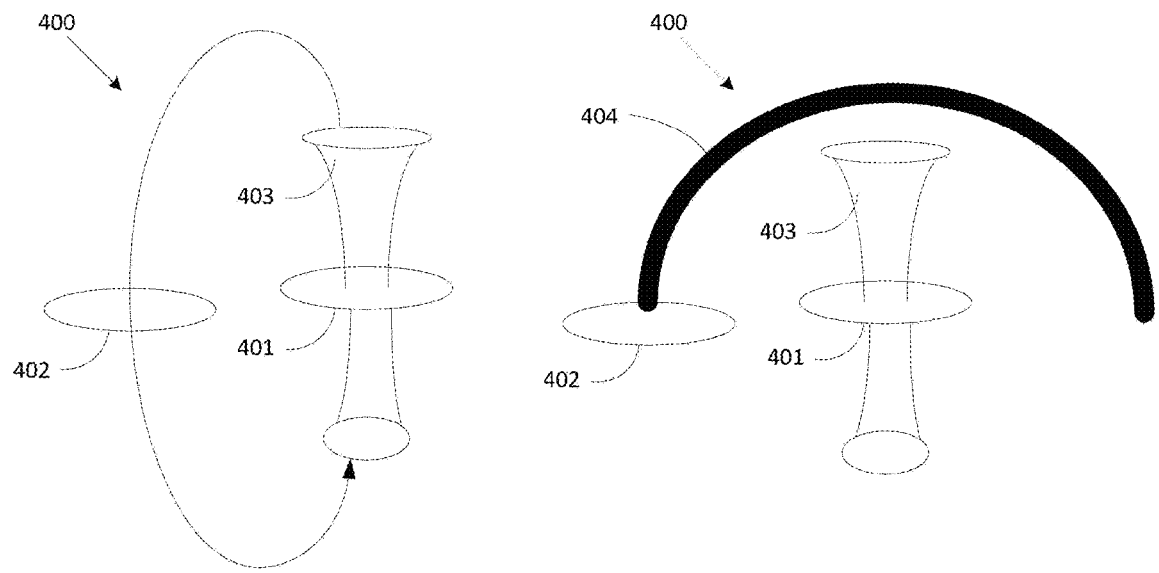
Figure 4B
Figure 4C

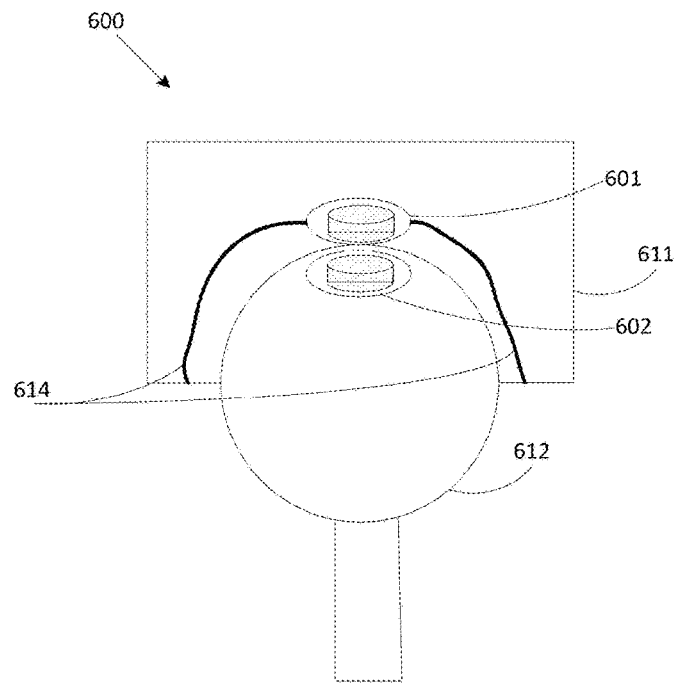
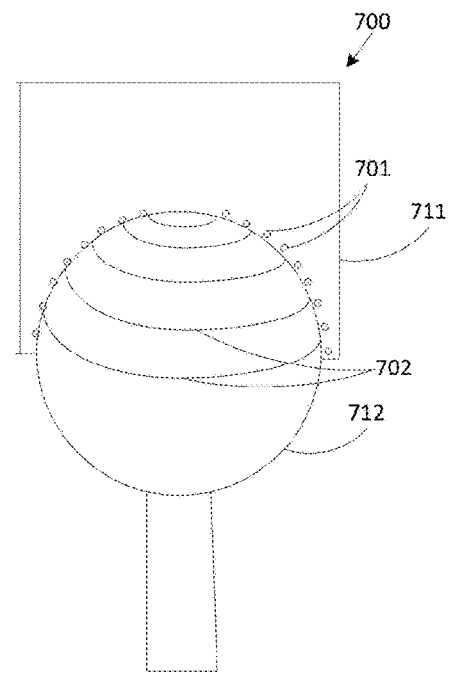
Figure 6F
Figure 7A
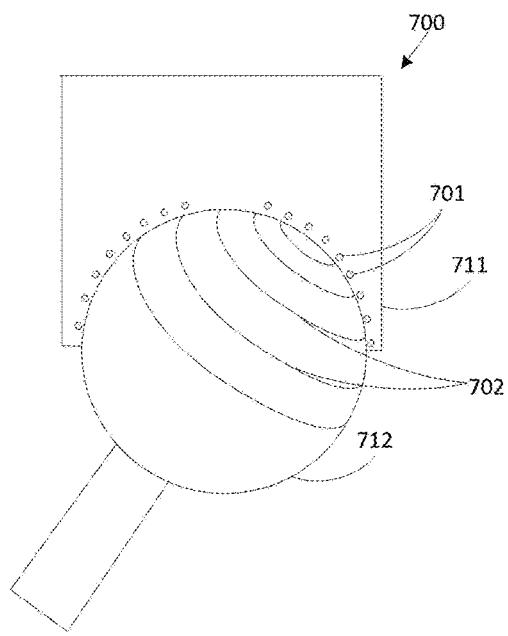
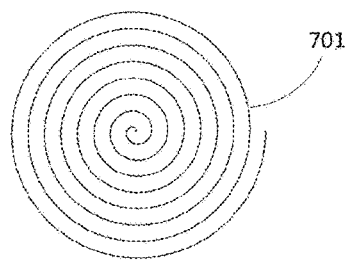
Figure 7B
Figure 7C

POWERED JOINT WITH WIRELESS TRANSFER

FIELD

The present invention relates to a powered joint having an inductive power transfer (IPT) system. More particularly, although not exclusively, the invention relates to coil and core topologies for use in the transmitters and receivers of such systems.

BACKGROUND

IPT systems are a well-known area of established technology (for example, wireless charging of electric toothbrushes) and developing technology (for example, wireless charging of handheld devices on a 'charging mat'). Typically, a primary side generates a time-varying magnetic field from a transmitting coil or coils. This magnetic field induces an alternating current in a suitable receiving coil that can then be used to charge a battery, or power a device or other load. In some instances, it is possible for the transmitter or the receiver coils to be connected with capacitors to create a resonant circuit, which can increase power throughput and efficiency at the corresponding resonant frequency.

A basic problem that must be overcome in any IPT system design is ensuring efficient power transfer. One approach to improve performance has been to require precise alignment of the transmitter and receiver coils, such as in the case of wireless charging of electric toothbrushes that use a dedicated charging mount. However, powered joints often require a large range of relative movement between joint components and so such tightly coupled solutions are unsuitable.

Powered joints may be employed in applications such as robotics where power transfer is required between the parts of complex articulated joints, including ball joints and universal joints. The use of a wired connection may constrain the range of motion, suffer from failure due to material fatigue, or result in vulnerable and unsightly exterior wiring. Typical IPT systems may not be useful, due to their inability to efficiently supply power over a wide range of movement.

US20030214255 discloses that providing a plurality of orthogonal transmitter coils improves the likelihood of a receiver coil intersecting the flux lines of the magnetic field. However, no detail is given as to a suitable receiver coil for this arrangement or how it may be implemented in a powered joint.

US20010000960 discloses an array of in-phase spiral current loops disposed adjacent to one another, defining a non-planar surface such as a sphere. However, again no detail is given on a suitable receiver coil arrangement or how it may be implemented in a powered joint.

WO2013/141717 discloses a range of transmitter and receiver coil topologies utilizing orthogonal sets of coils but there is no disclosure as to how these may be implemented within a joint.

It is an object of the invention to provide a powered joint providing effective power transfer over a wide range of movement, or to at least provide the public with a useful choice.

SUMMARY

According to one example embodiment there is provided a powered joint having a first joint component and second joint component in which the first joint component has multiple degrees of rotational freedom with respect to the second joint component, the powered joint including:
one or more power transmission coils associated with the first component;
a plurality of power receiving coils associated with the second component;
a sensor which determines the orientation of the second component with respect to the first component; and
a control circuit for selectively connecting one of the plurality of power receiving coils to a power receiving circuit based on information received from the sensor.

According to another example embodiment there is provided a powered joint having a first joint component and second joint component in which the first joint component has multiple degrees of rotational freedom with respect to the second joint component, the powered joint including:
a plurality of power transmission coils associated with the first component;
one or more power receiving coils associated with the second component;
a sensor which determines the orientation of the second component with respect to the first component; and
a control circuit for selectively connecting one of the plurality of power transmitting coils to a coil drive circuit based on information received from the sensor.

According to a further example embodiment there is provided a powered joint having a first joint component and second joint component in which the first joint component has multiple degrees of rotational freedom with respect to the second joint component, the powered joint including:
one or more power transmission coil associated with the first component; and
one or more power receiving coil associated with the second component,
wherein the receiving coil is spaced away from the transmitting coil and remains generally aligned with a radial line from the center of the transmitting coil throughout the range of movement of the joint.

According to another example embodiment there is provided a core formed of a magnetically permeable material comprising an outer partial hemisphere having a central post projecting from the hemisphere towards the center of the hemisphere.

According to a still further example embodiment there is provided a powered joint having a first joint component and second joint component in which the first joint component has multiple degrees of rotational freedom with respect to the second joint component, the powered joint including:
one or more power transmission coils associated with the first component; and
one or more power receiving coil associated with the second component;
wherein each coil has an associated magnet so that proximate transmitter and receiver coil pairs are maintained in alignment due to magnetic attraction between the magnets.

According to a yet further example embodiment there is provided a powered joint having a first joint component and second joint component in which the first joint component has multiple degrees of rotational freedom with respect to the second joint component, the powered joint including:
a plurality of power transmission coils associated with the first component; and
a plurality of power receiving coils associated with the second component;
wherein the transmission and receiving coils are spaced apart and are rotatably movable relative to each other.

According to another example embodiment there is provided a powered joint having a first joint component and second joint component in which the first joint component has one or more degrees of rotational freedom with respect to the second joint component, the powered joint including:
- a power transmission coil associated with the first component; and
- a power receiving coil associated with the second component
- wherein the power receiving coil is moveable with respect to the second component so that it can be maintained in a desired alignment with the power transmission coil.

According to a still further example embodiment there is provided an arrangement for powering a device having free spatial movement in two or more dimensions including a powered support connected to two or more relatively moveable elements by a powered joint having a first joint component and a second joint component, the first joint component having multiple degrees of rotational freedom with respect to the second joint component, the powered joint including:
- a plurality of power transmission coils associated with the first component; and
- a plurality of power receiving coils associated with the second component;
- wherein the transmission and receiving coils are spaced apart and are rotatably movable relative to each other.

According to a yet further example embodiment there is provided a powered ball and socket joint having a ball having multiple degrees of rotational freedom with respect to socket, the powered joint including:
- a helically wound power transmission coil provided in the ball; and
- a helically wound power receiving coil provided in the socket.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 4A shows a coil arrangement in which one or more receiver coils are arranged radially around a transmitting coil;

FIG. 4B shows the coil arrangement of the type shown in FIG. 4A wherein the transmitting coil has a central transmitter core;

FIG. 4C shows the coil arrangement of the type shown in FIG. 4A wherein the transmitting coil has a central transmitter core and the receiving coil includes an arcuate core;

FIGS. 6A-6F show coil arrangements in which magnets are used to align the transmitter and receiver coils;

FIGS. 7A-7C show powered joints in which helical transmitting and receiving coils are located near the surface of a ball and socket.

DETAILED DESCRIPTION

Figure 1A:
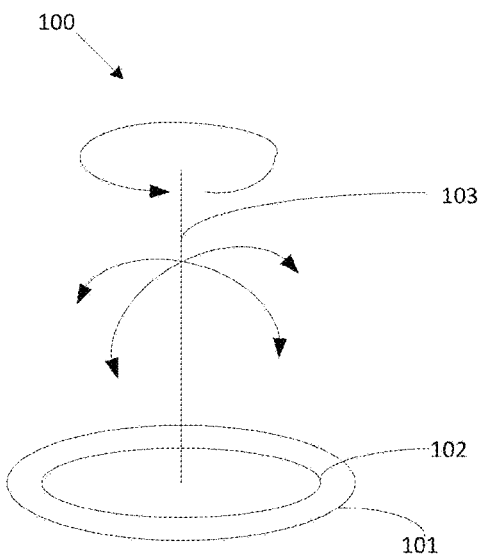
FIG. 1A shows a single transmitter coil and a single receiver coil rotatable with multiple degrees of rotational freedom.
Figure 1B:
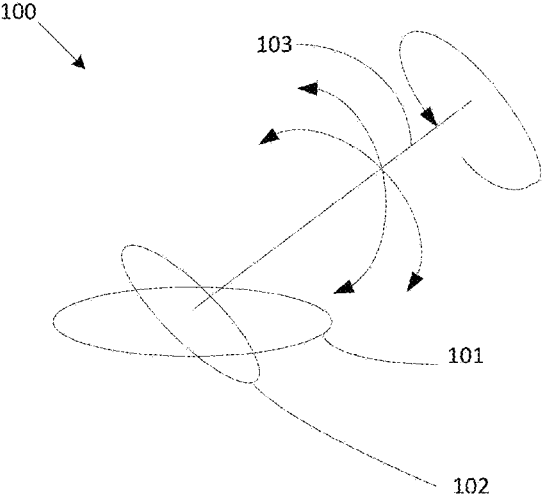
FIG. 1B shows the arrangement of FIG. 1A when one coil is rotated with respect to the other.

FIG. 1A illustrates a coil arrangement 100 including a transmitter coil 101 that receives power from a source (not shown) to generate an alternating magnetic field. A receiving coil 102 is rotatable relative to transmitting coil 101 about its axis 103 and may be tilted as shown in FIG. 1B. Optimum power transfer occurs when the coils have the highest coupling coefficient in the position shown in FIG. 1A. However, coupling decreases as the receiving coil 102 is tilted with respect to the transmitting coil 101, as shown in FIG. 1B. If the coils 101 and 102 are oriented such that the coupling coefficient is low, then the supplied power will be significantly reduced. While capable of transferring power, this arrangement is not particularly suitable for efficiently supplying constant power to moving components requiring a relatively large degree of rotational freedom.

Figure 2A:
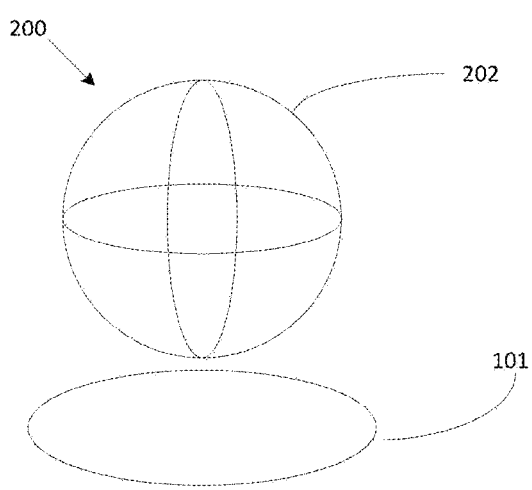
FIG. 2A shows a coil arrangement consisting of 3 orthogonal receiver coils having multiple degrees of rotational freedom with respect to a spaced apart transmitter coil.
Figure 2B:
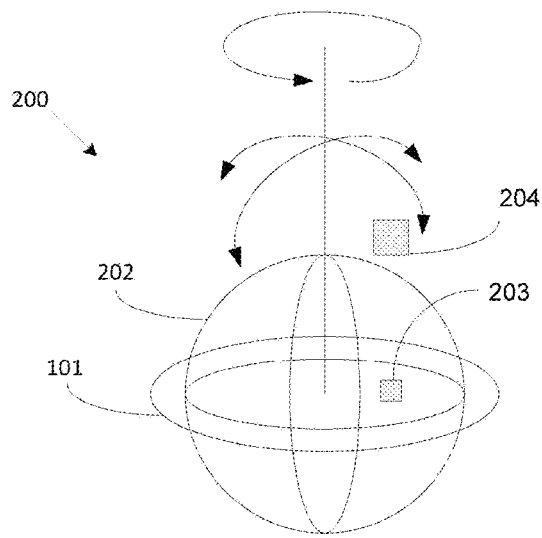
FIG. 2B shows a coil arrangement consisting of 3 orthogonal receiver coils having multiple degrees of rotational freedom with respect to a surrounding transmitter coil.

The receiver coil arrangement 202 of FIG. 2A has three orthogonal coils. This arrangement allows three degrees of rotational freedom with one receiving coil having good coupling in any position. The arrangement shown in FIG. 2B is suitable for use in a ball and socket joint with the transmitter coil housed in the socket and the receiving coil assembly 202 housed within the ball. The arrangement could also be employed in a universal joint. This arrangement ensures that at least one of the receiving coils is sufficiently coupled with the transmitter coil to effectively transfer power in all relative positions. However, to select the best coupled receiving coil may require measurement of the coupling between coils, which may take too long for real world applications. To enable rapid coil switching a sensor 203 may be provided to determine the orientation of the receiver coil arrangement 202 with respect to the transmitter coil 101. The orientation sensor may be any one of a gyroscope, accelerometer, magnetic field sensor, IMU, compass, gravity switch, or any other appropriate means of determining orientation. Based on the positional information from sensor 203 a controller 204 may selectively connect one of the receiver coils to a power flow controller supplying power to a load on the receiver side of the joint. The controller 204 may store in memory which coil to select based orientation information from the sensor. To improve transfer efficiency additional transmitter and/or receiver coils may also be provided at other angles.

Figure 2C:
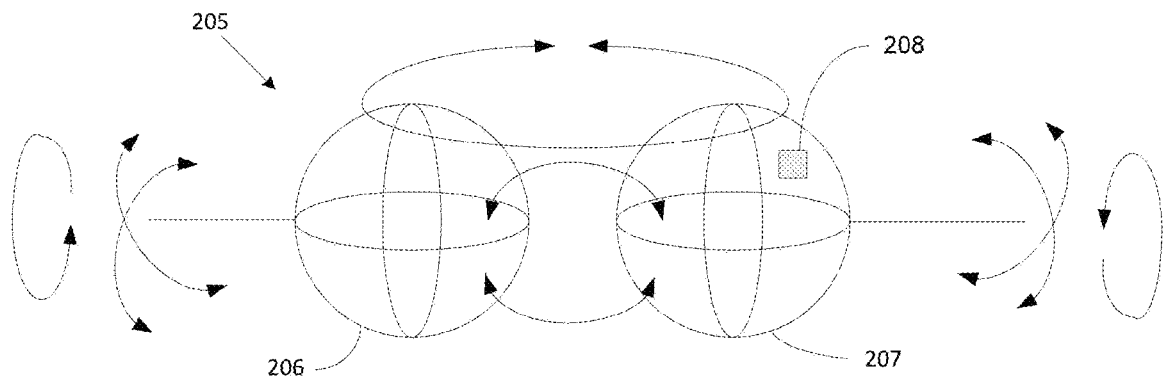
FIG. 2C shows a coil arrangement consisting of 3 orthogonal receiver coils having multiple degrees of rotational freedom with respect to 3 orthogonal transmitter coils.

A coil arrangement 205 including a three orthogonal transmitter coils 206 and 3 orthogonal receiver coils 207 is shown in FIG. 2C. As in the previous topology, a suitable orientation sensor 208 may be used to selectively connect one transmitter coil with the best coupled receiver coil.

Figure 3A:
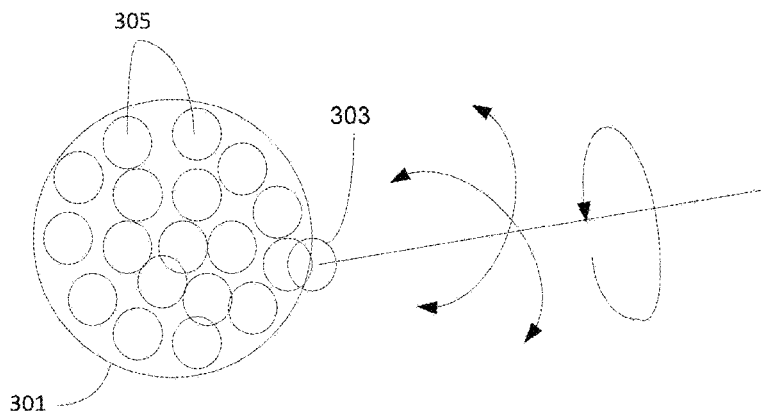
FIG. 3A shows a coil arrangement in which several spiral coils are located on the surface of a sphere which moves relative to a single coil.
Figure 3B:
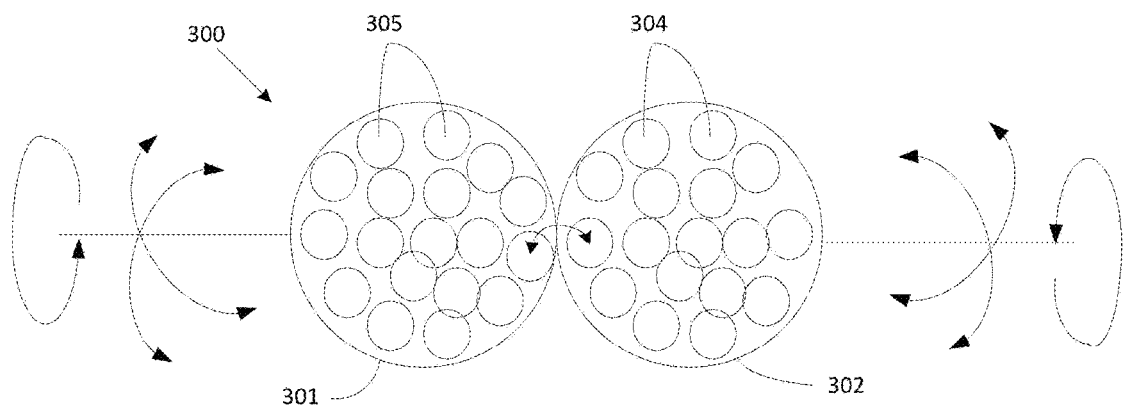
FIG. 3B shows a coil arrangement in which several spiral coils are located on the surface of a first sphere which moves relative to a second sphere having spiral coils on its surface.

Another way to achieve improved coupling in a device having multiple degrees of rotational freedom is to position a series of spiral transmitter or receiver coils 305 on the surface of a spherical transmitter which is rotatable relative to a transmitter or receiver coil 303 as shown in FIG. 3A. This type of arrangement may be suitable for a ball and socket joint. A transmitter and receiver pair may be selected or multiple transmitter coils may be driven with opposite polarity to enhance power transfer to a single receiver coil. FIG. 3B shows an arrangement where both the transmitter 301 and receiver 302 have an arrangement of helical coils 305 and 304 on their spherical surfaces to enable both rotation and orbiting about each other.

FIG. 4A shows an arrangement that may be particularly suitable for a ball and socket joint where one or more receiver coils 402 are provided in the socket part of a joint and a central transmitter coil 401 is provided in the ball part of the joint. The one or more receiver coils 402 may be arranged in a ring around a central transmitter coil 401 or vice versa. This topology utilizes the fact that transmitter coil 401 produces a generally toroidal magnetic flux (one flux line is indicated at 403) and each receiver coil moves generally along these flux lines. In the case of rotation about the axis of the joint the flux is substantially uniform. When the ball is tilted relative to the socket each receiver coil generally follows the flux lines and so remains well coupled to the transmitter coil. This topology thus provides good coupling over a wide range of relative joint movements without requiring coil switching.

To further improve coupling a core having high magnetic permeability, such as a ferrite core 403 shown in FIG. 4B, may be used to shape the magnetic field. The ferrite core 403 extends above and below the coil, and if used in a ball joint, may extend to the periphery of the ball, as shown in FIG. 4C. Additionally, a ferrite core 404 may extend through coil 402 and around the socket of the ball joint, as shown in FIG. 4C, such as to maintain only a small air gap between transmitter and receiver ferrites 403 and 404 throughout the range of movement of the joint. The other receiver coils may also have similar ferrites which connect at the top. The placement of the ferrites may be arranged to preferentially power different coils at different joint positions.

Figure 5A:
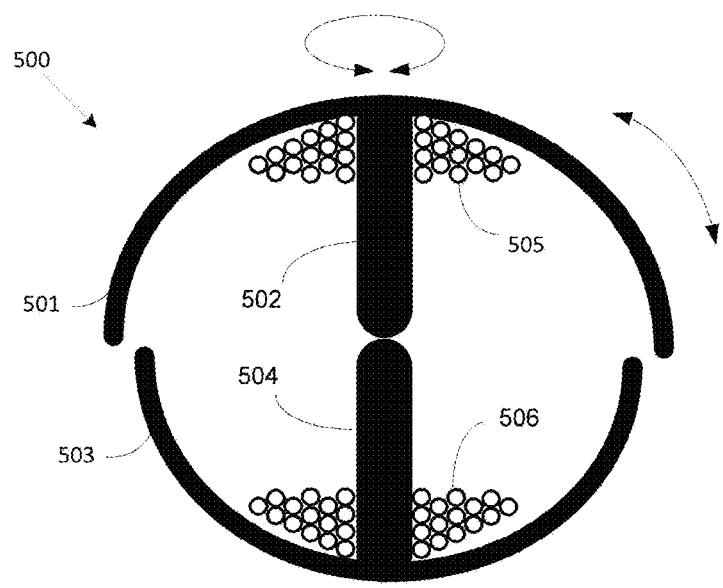
FIGS. 5A-5B show a pot core type arrangement allowing rotation with multiple degrees of rotational freedom.
Figure 5B:
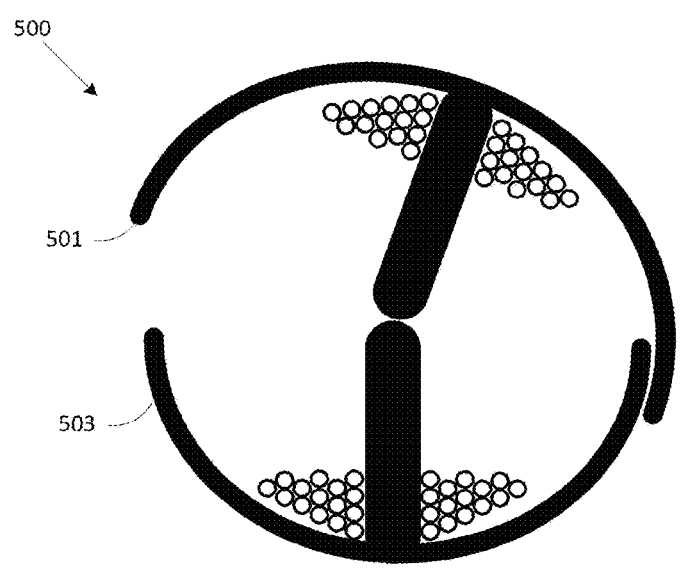

Another arrangement utilizing ferrites to improve the magnetic coupling is shown in 5A and 5B. In this embodiment a pot core type ferrite structure 500 is used including an upper ferrite consisting of a hemispherical part 501 and a central post 502 and a lower ferrite consisting of a hemispherical part 503 and a central post 504. A transmitter coil 506 is wound about post 504 and a receiver coil 505 is wound about post 502. In this arrangement the two ferrite sections are free to rotate and tilt with respect to each other, as shown in the tilted view in FIG. 5B. This arrangement ensures that there is always only a small air gap between posts 502 and 504 and hemispheres 501 and 503 at all times ensuring a high magnetic permeability path in all orientations and thus efficient power transfer in all orientations without the need for any coil switching.

Figure 6A:
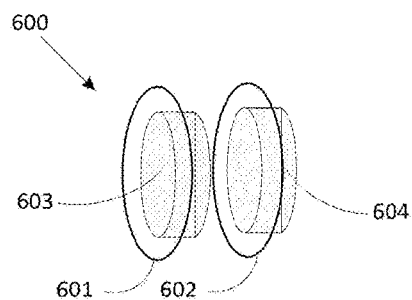

An alternative means of maintaining alignment of transmitter and receiver coils may be provided by magnets of opposite polarity associated with transmitting and receiving coils as shown in FIG. 6A. In this embodiment coil 601 is wound about permanent magnet 603 and coil 602 is wound about permanent magnet 604. The opposing faces of the permanent magnets have opposite magnetic polarity so that they attract to each other to align the coils. The permanent magnets also provide a high magnetic permeability path for the magnetic flux to improve power transfer. Whilst centralized coil alignment is shown any suitable alignment that assists with power transfer may be employed.

Figure 6B:
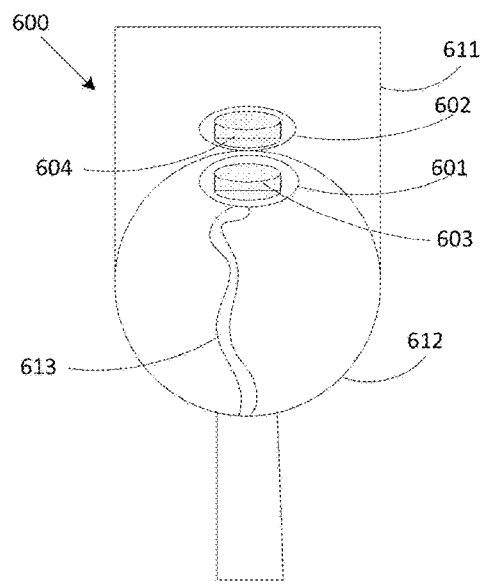
Figure 6C:
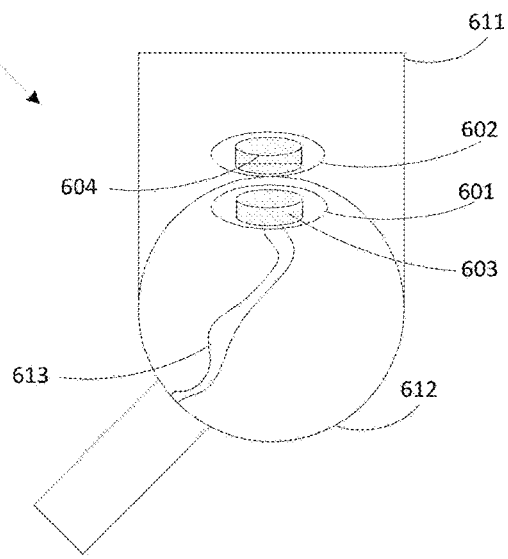

This general method of coil alignment is shown in a ball and socket joint in FIGS. 6B and 6C. In this embodiment coil 602 is mounted in fixed relation to socket 611 near to ball 612. Coil 601 is provided within a cavity in ball 612 and is free to move relative to ball 612. The cavity may be empty or filled with a fluid or some other medium. Alternatively coil 601 may be supported by resilient elements which return coil 601 to a centralized position when no external magnetic force is present but allow movement within the cavity. Flexible conductive wires 613 convey power to or from coil 601 whilst allowing relatively free movement of coil 601 within the cavity. Due to magnetic attraction between magnets 603 and 604 coils 601 and 602 are held close and in alignment when ball 612 moves with respect to socket 611, as illustrated in FIG. 6C where coil 601 has moved within the cavity relative to its original position shown in FIG. 6B.

Figure 6D:
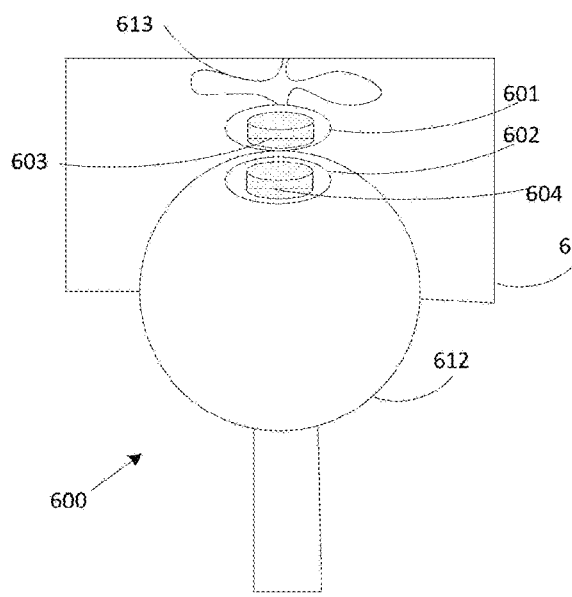
Figure 6E:
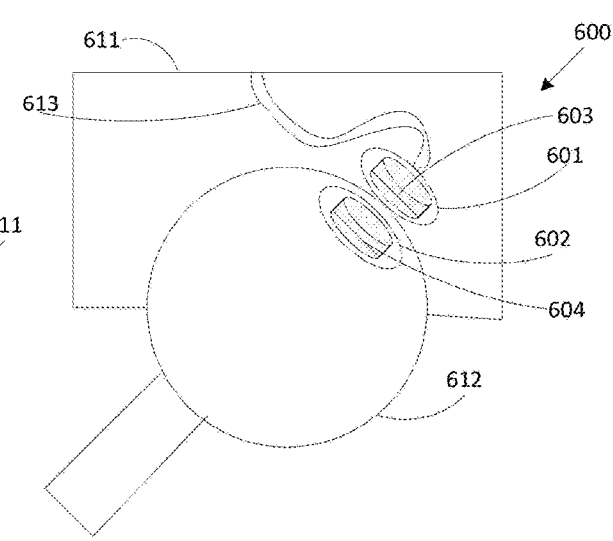

FIGS. 6D and 6E show an alternate embodiment in which the moveable coil is located in the socket. In this case the arrangement is generally the same as for that shown in FIGS. 6B and 6C except that coil 601 is located in a cavity within the socket 611 instead of being within a cavity in the ball. FIG. 6F shows a variant of the design shown in FIGS. 6D and 6E including resilient elements 614 that act to centralize coil 601 but which stretch to allow coil 601 to follow coil 602 due to the magnetic attraction between magnets.

FIGS. 7A to 7C show a further coil arrangement for a ball and socket joint utilizing helical coils 701 and 702 wound close to the surface of each of the ball 712 and socket 711. A cutaway view of the socket with the ball inserted is shown in FIGS. 7A and 7B (i.e. a similar helically hound winding is provided in the socket but only the cross-sections of the windings are visible). A top view of a helical coil 701 is shown in FIG. 7C. Due to the distribution of the helical windings over the ball and socket effective power transfer may be achieved over a relatively large range of movement as shown in FIG. 7B.

Figure 8:
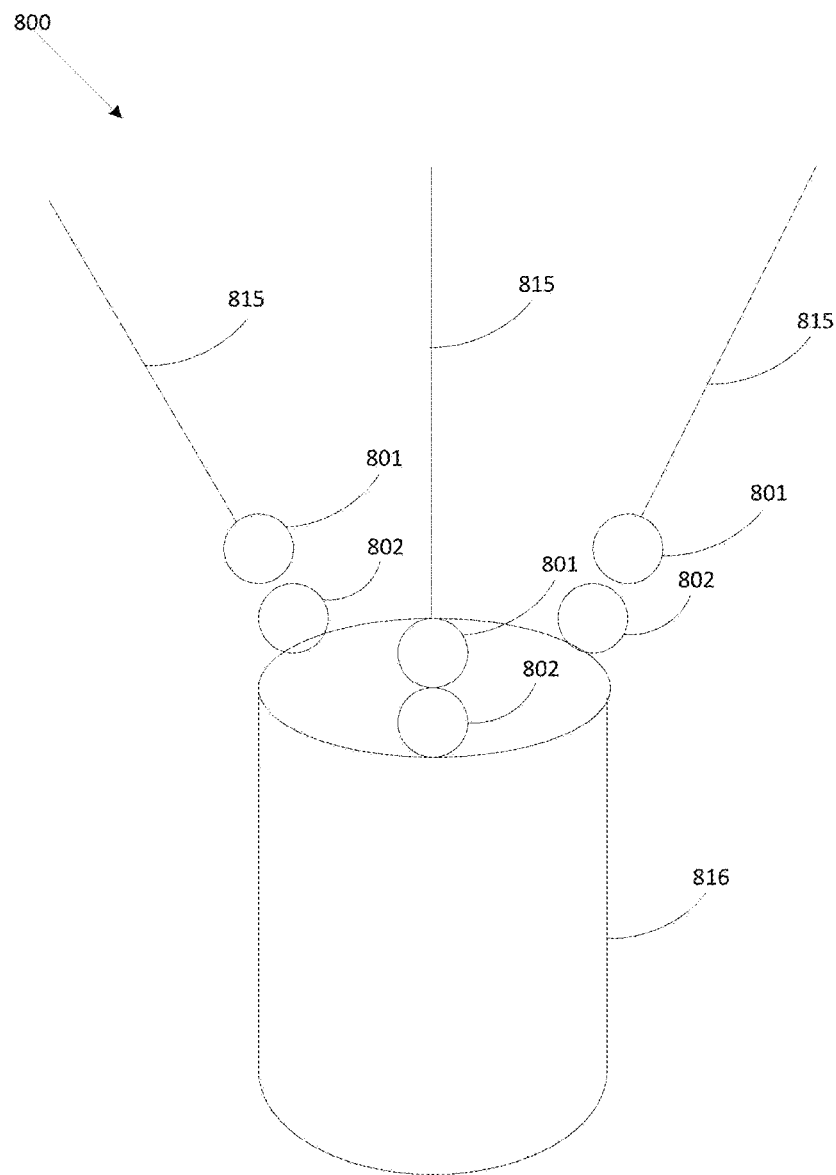
FIG. 8 is a diagram of an IPT system in which power is transmitted to a platform using tethers.

FIG. 8 shows a system to provide power wirelessly through tethers 815 to a hanging device or platform 816, allowing the device or platform 816 to rotate with respect to the tethers 815. A pair of IPT ball connectors 801 and 802, such as those shown in FIG. 2C, are held in place by a joint (not shown) that maintains a fixed separation while allowing the ball connectors 801 and 802 to rotate with multiple degrees of rotational freedom. One example of a suitable application for this arrangement is a delta robot, commonly used in 3D printers, where a heated nozzle is positioned typically using three tethers moving up and down on belts attached to fixed support poles. The heated nozzle requires power to heat it, and the use of such an inductive power transfer system 800 may reduce wear on electronic components.

The described coil arrangements provide good inductive coupling in mechanical joints. While embodiments have been described with reference to a particular joint configuration, they could also be applied to other systems having multiple degrees of rotational freedom that would benefit from the simplicity of wireless power transfer. These applications include, but are not limited to robotics, prosthetics, industrial automation, household and industrial appliances and toys.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A powered articulated mechanical joint comprising:
a first articulated mechanical joint component mechanically coupled to a second articulated mechanical joint component, in which the first articulated mechanical joint component has multiple degrees of rotational freedom with respect to the second articulated mechanical joint component;
one or more power transmission coils associated with the first articulated mechanical joint component;
a plurality of power receiving coils associated with the second articulated mechanical joint component;
a sensor which determines the orientation of the second articulated mechanical joint component with respect to the first articulated mechanical joint component; and
a control circuit for selectively connecting one of the plurality of power receiving coils to a power receiving circuit based on information received from the sensor.

2. A powered articulated mechanical joint as claimed in claim 1 wherein the sensor is one of: a gyroscope; an accelerometer; a magnetic field sensor; an IMU; a compass; and a gravity switch.

3. A powered articulated mechanical joint as claimed in claim 2 including a single transmission coil.

4. A powered articulated mechanical joint as claimed in claim 3 including two orthogonal power receiving coils or three orthogonal power receiving coils.

5. A powered articulated mechanical joint as claimed in claim 4 wherein the articulated mechanical joint is a ball and socket joint.

6. A powered articulated mechanical joint comprising:
a first articulated mechanical joint component mechanically coupled to a second articulated mechanical joint component in which the first articulated mechanical joint component has multiple degrees of rotational freedom with respect to the second articulated mechanical joint component;
a plurality of power transmission coils associated with the first articulated mechanical component;
one or more power receiving coils associated with the second articulated mechanical component;
a sensor that determines the orientation of the second articulated mechanical component with respect to the first articulated mechanical component; and
a control circuit for selectively activating one of the plurality of power transmission coils based on information received from the sensor.

7. A powered articulated mechanical joint as claimed in claim 6 wherein the sensor is one of: a gyroscope; an accelerometer; a magnetic field sensor; an IMU; a compass; and a gravity switch.

8. A powered articulated mechanical joint as claimed in claim 7 including a single power receiving coil.

9. A powered articulated mechanical joint as claimed in claim 8 including two orthogonal power transmission coils or three orthogonal power transmission coils.

10. A powered articulated mechanical joint as claimed in claim 9 wherein the articulated mechanical joint is a ball and socket joint.

11. An arrangement for powering a device having free spatial movement in two or more dimensions, the arrangement comprising:
a powered support connected to two or more relatively moveable elements by a powered articulated mechanical joint, the powered articulated mechanical joint having a first articulated mechanical joint component mechanically coupled to a second articulated mechanical joint component, the first articulated mechanical joint component having multiple degrees of rotational freedom with respect to the second articulated mechanical joint component, the powered articulated mechanical joint further comprising:
a plurality of power transmission coils associated with the first articulated mechanical joint component; and
a plurality of power receiving coils associated with the second articulated mechanical joint component;
wherein the transmission and receiving coils are spaced apart and are rotatably movable relative to each other.

12. An arrangement as claimed in claim 11 wherein the powered articulated mechanical joint includes at least two orthogonally arranged power transmission coils and at least two orthogonally arranged power receiving coils.

13. An arrangement as claimed in claim 11 wherein the powered articulated mechanical joint includes three orthogonally arranged power transmission coils and three orthogonally arranged power receiving coils.

14. An arrangement as claimed in claim 11 wherein the powered articulated mechanical joint has transmission coils arranged on a curved surface.

15. An arrangement as claimed in claim 11 wherein the powered articulated mechanical joint has receiving coils arranged on a curved surface.

16. An arrangement as claimed in claim 11 wherein the powered articulated mechanical joint includes permanent magnets located within each coil having polarities that maintain respective transmission and receiving coil pairs in alignment.

17. An arrangement as claimed in claim 11 wherein the powered articulated mechanical joint includes a pair of transmission coils driven with opposite polarity.

18. An arrangement as claimed in claim 11 wherein the powered articulated mechanical joint includes an orientation sensor to power appropriate transmission coils based on the relative orientation of the transmission and receiving coils.

19. An arrangement as claimed in claim 11 including three relatively movable elements.

20. A powered articulated mechanical joint as claimed in claim 4 wherein the articulated mechanical joint is a universal joint.

21. A powered articulated mechanical joint as claimed in claim 9 wherein the articulated mechanical joint is a universal joint.

22. An arrangement as claimed in claim 11 wherein the powered articulated mechanical joint is a universal joint.

23. An arrangement as claimed in claim 11 wherein the powered articulated mechanical joint is a ball and socket joint.

* * * * *